July 1, 1924.
W. E. IKERMAN
AERIAL TRAIN
Filed Oct. 7, 1922
1,499,825
12 Sheets-Sheet 8
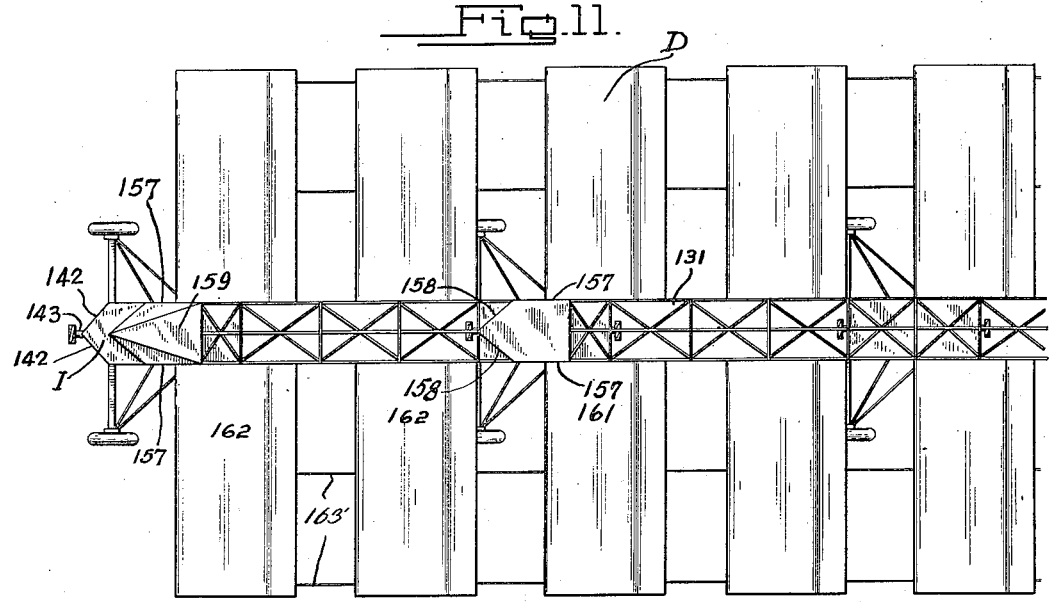
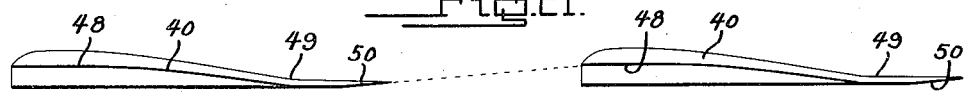
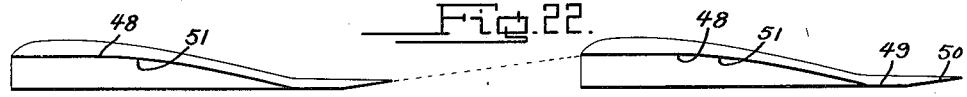
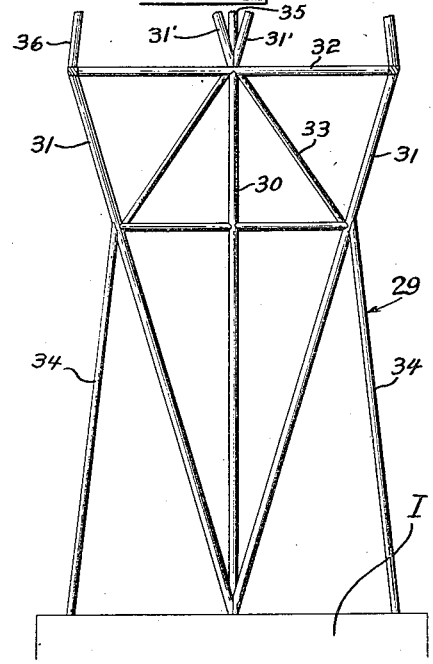
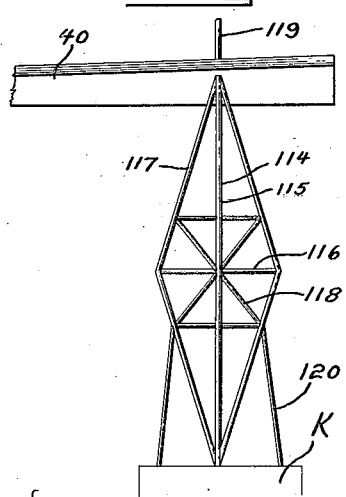
Inventor
Wayne E. Ikerman
By Lancaster and Allwine
Attorneys

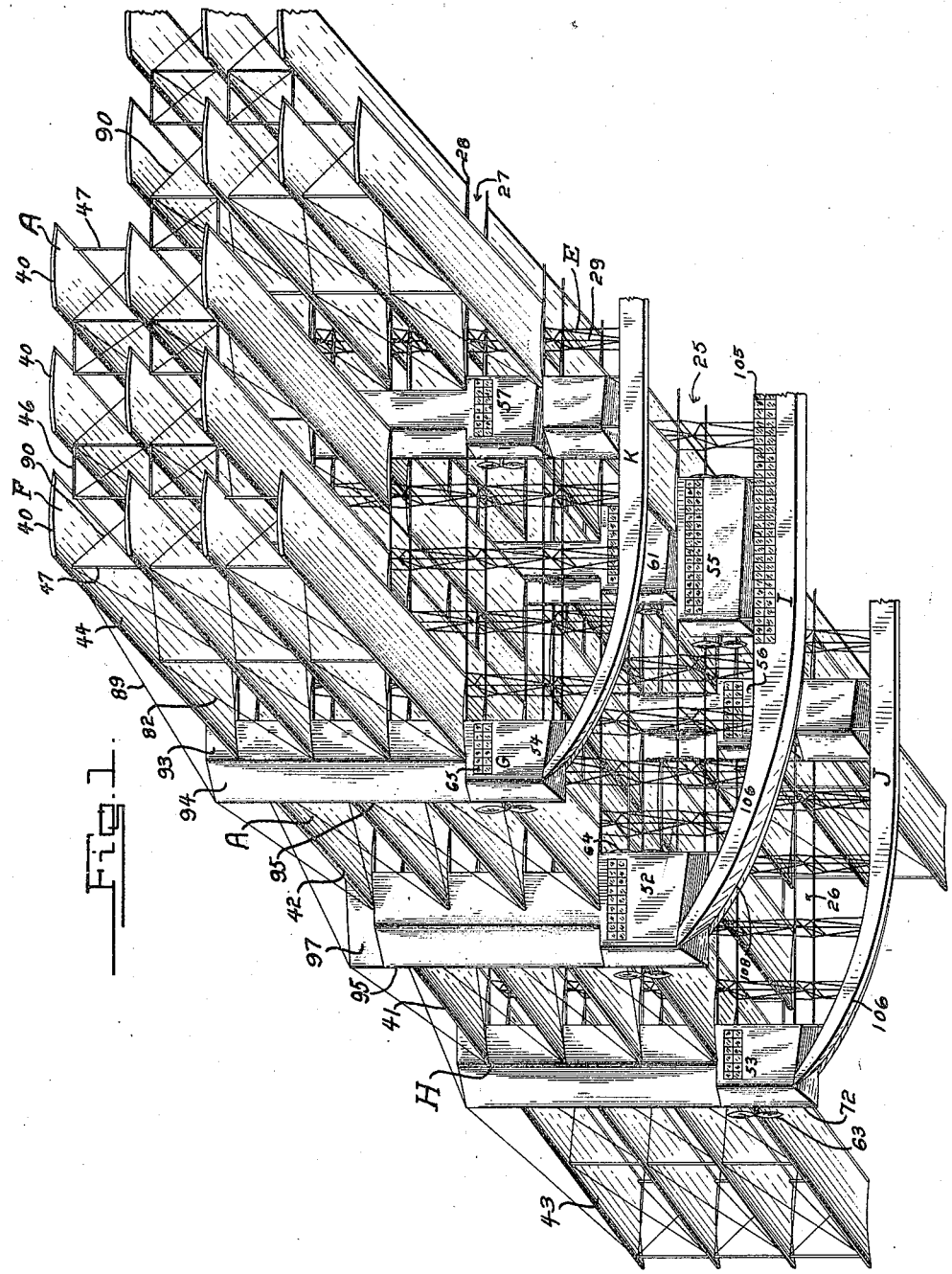

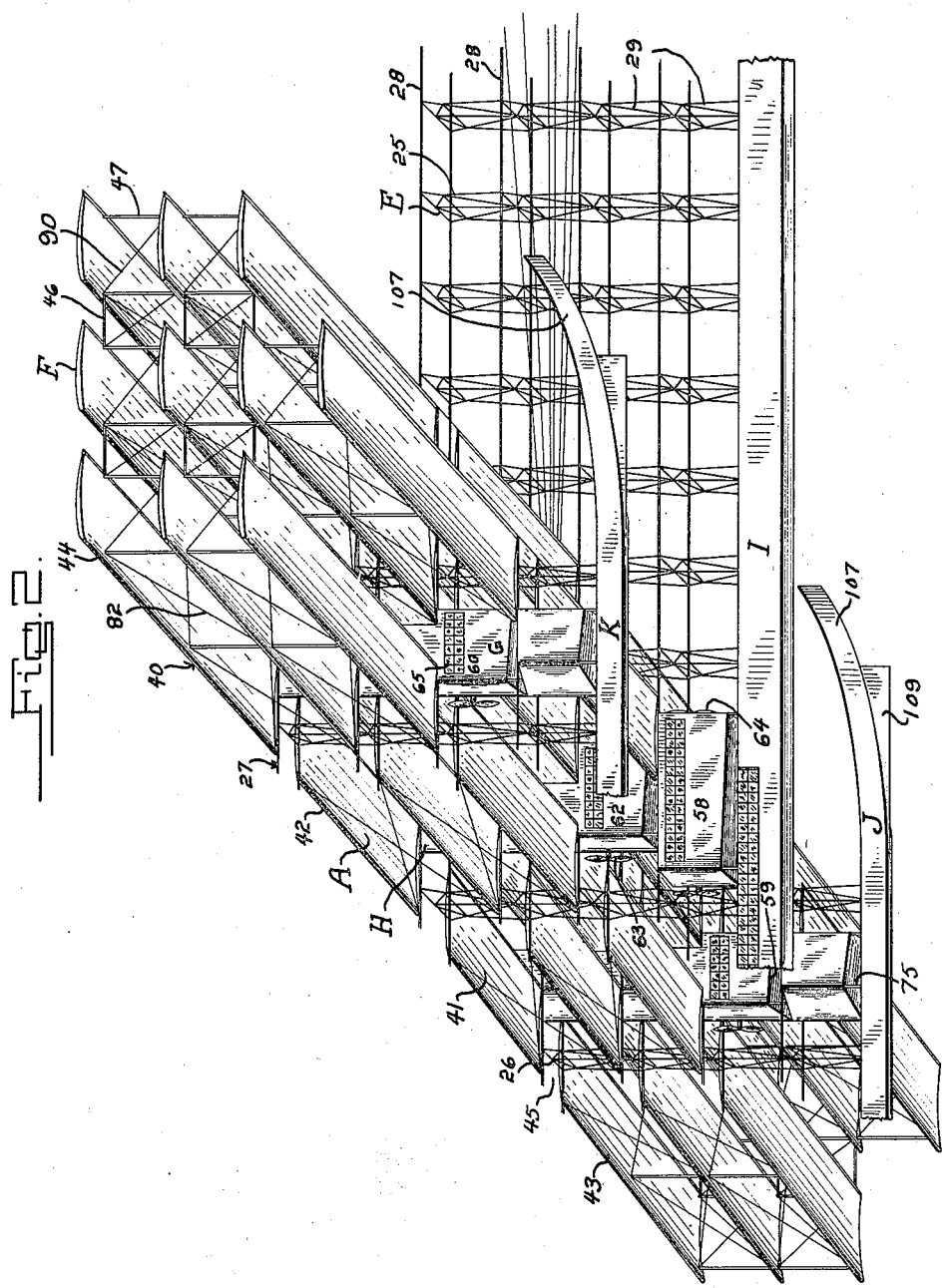

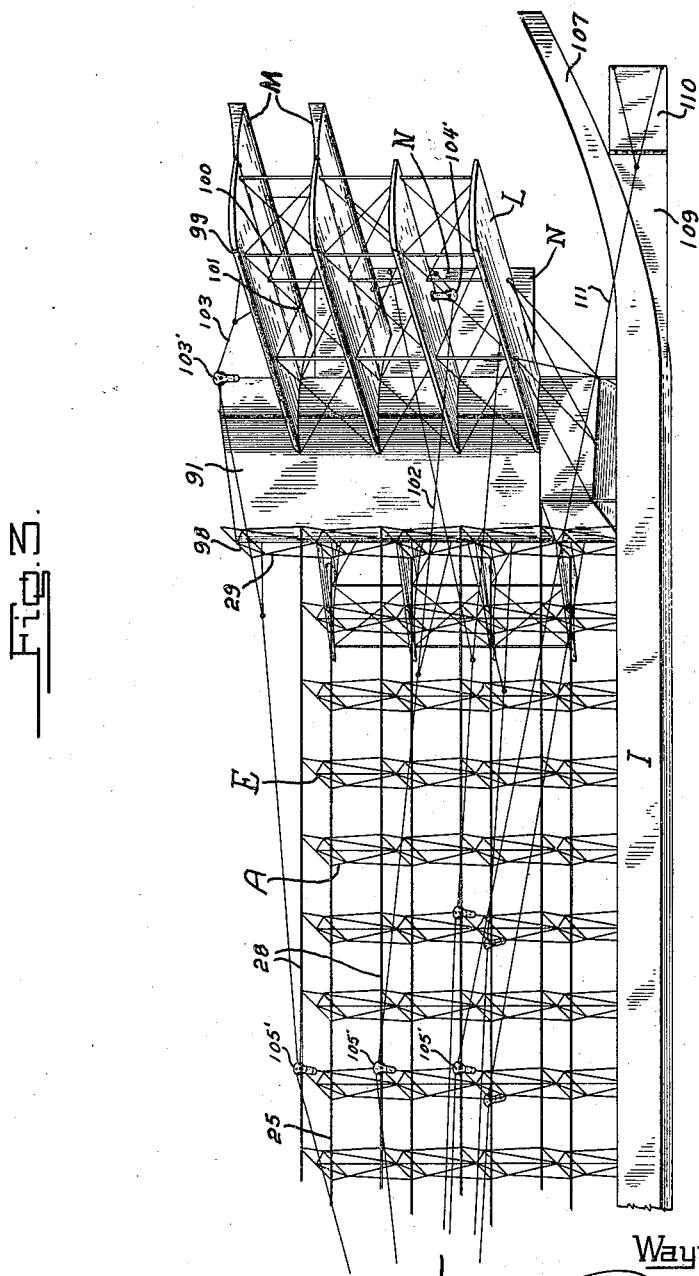

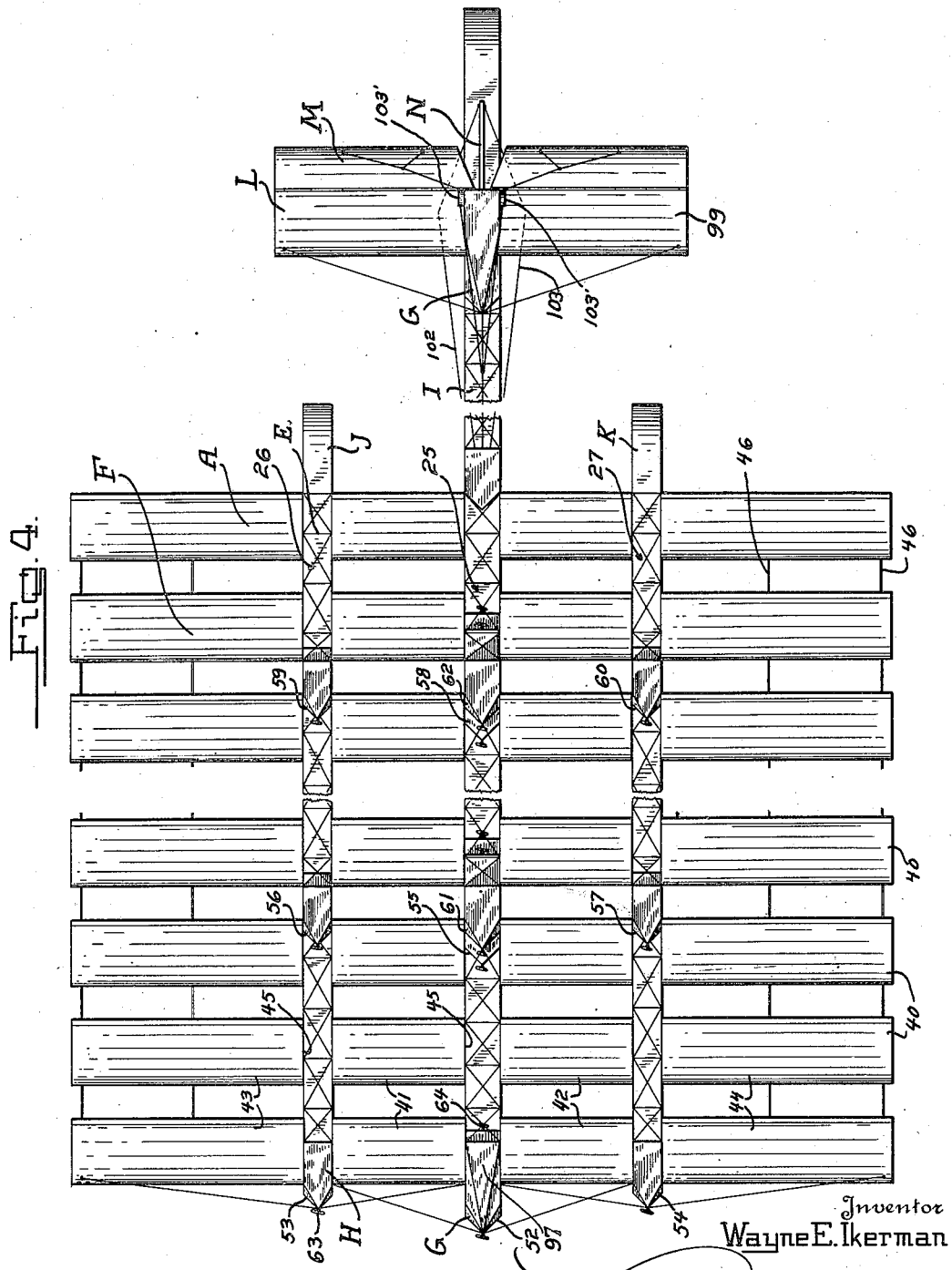

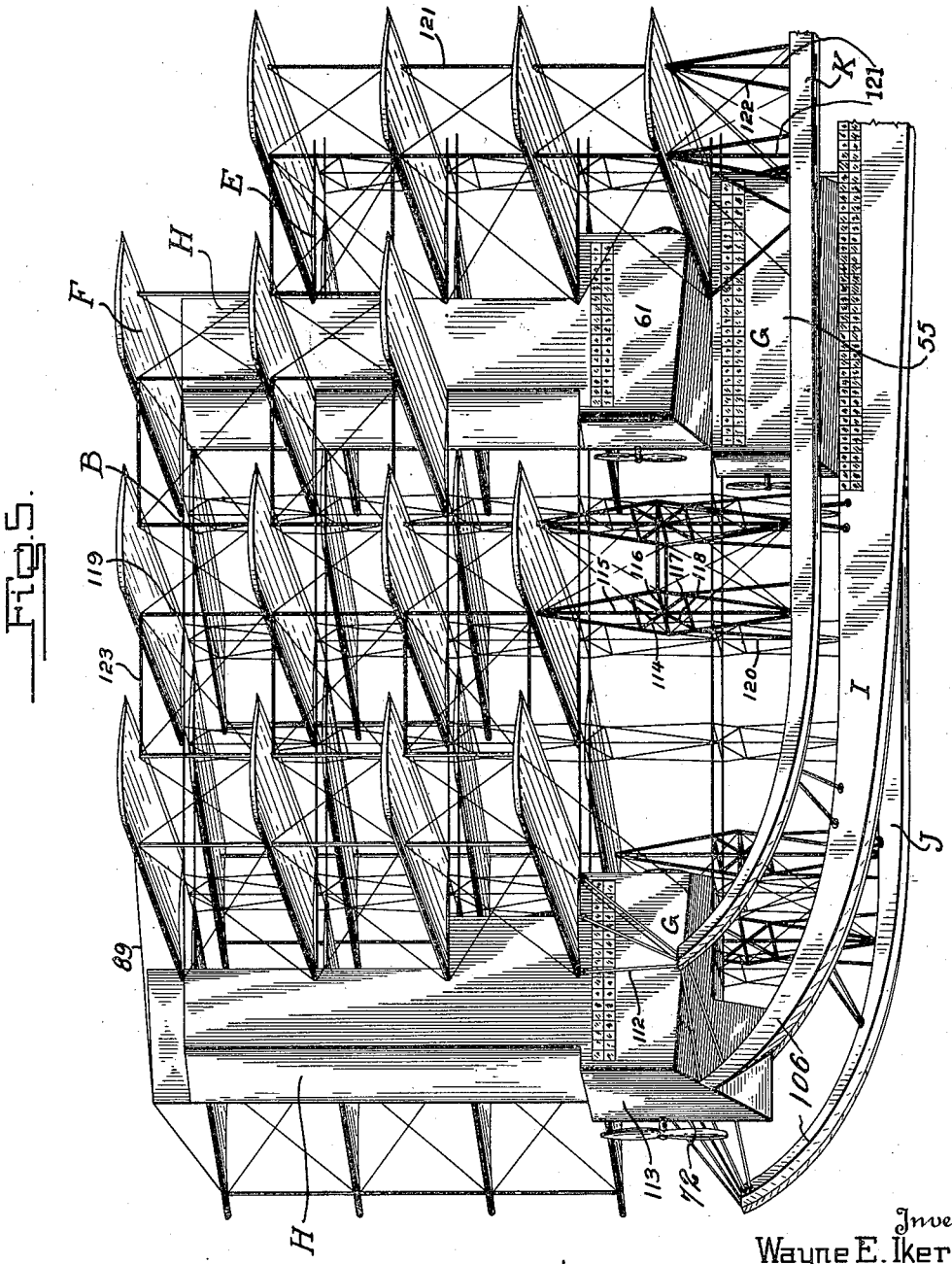

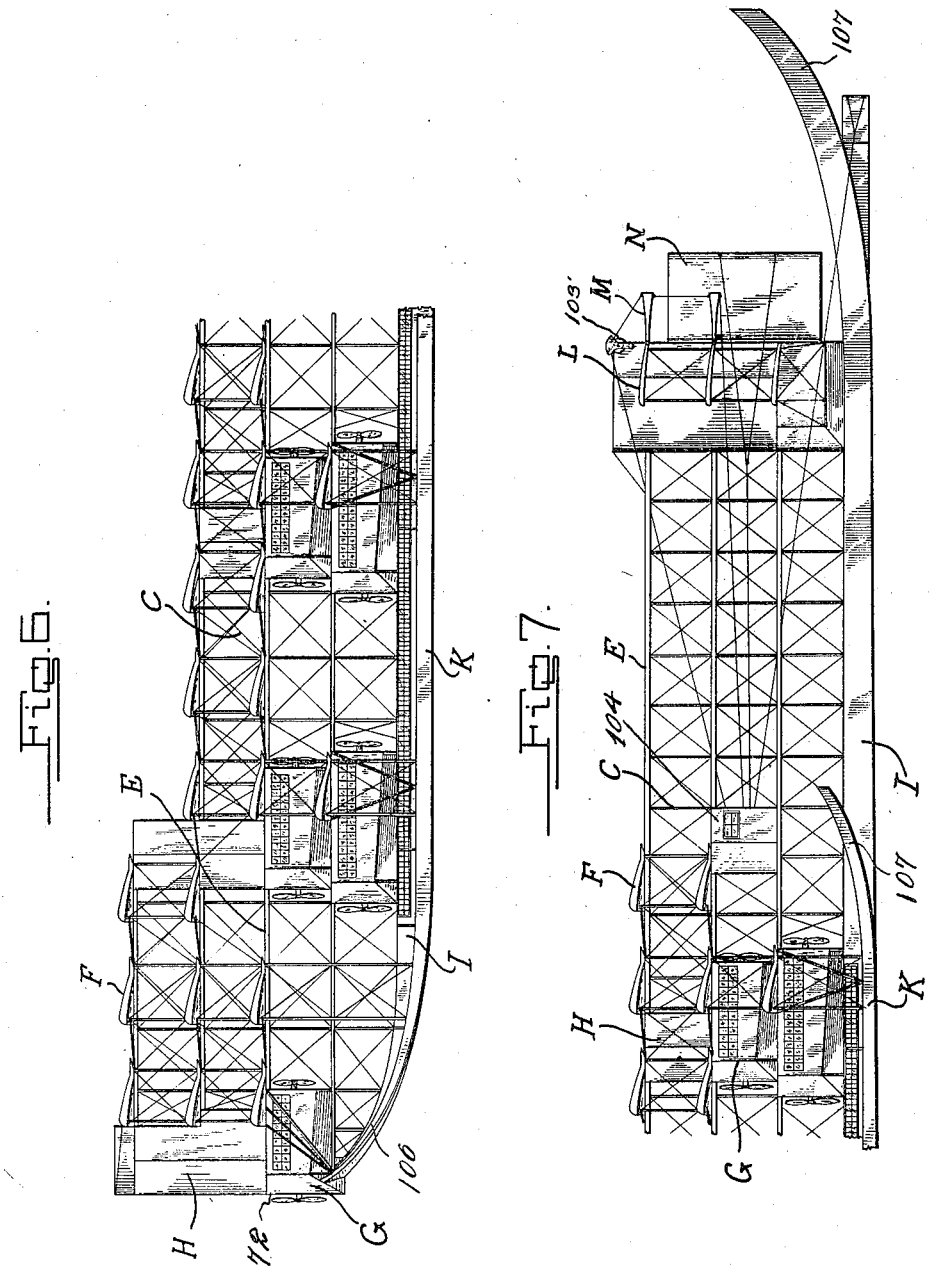

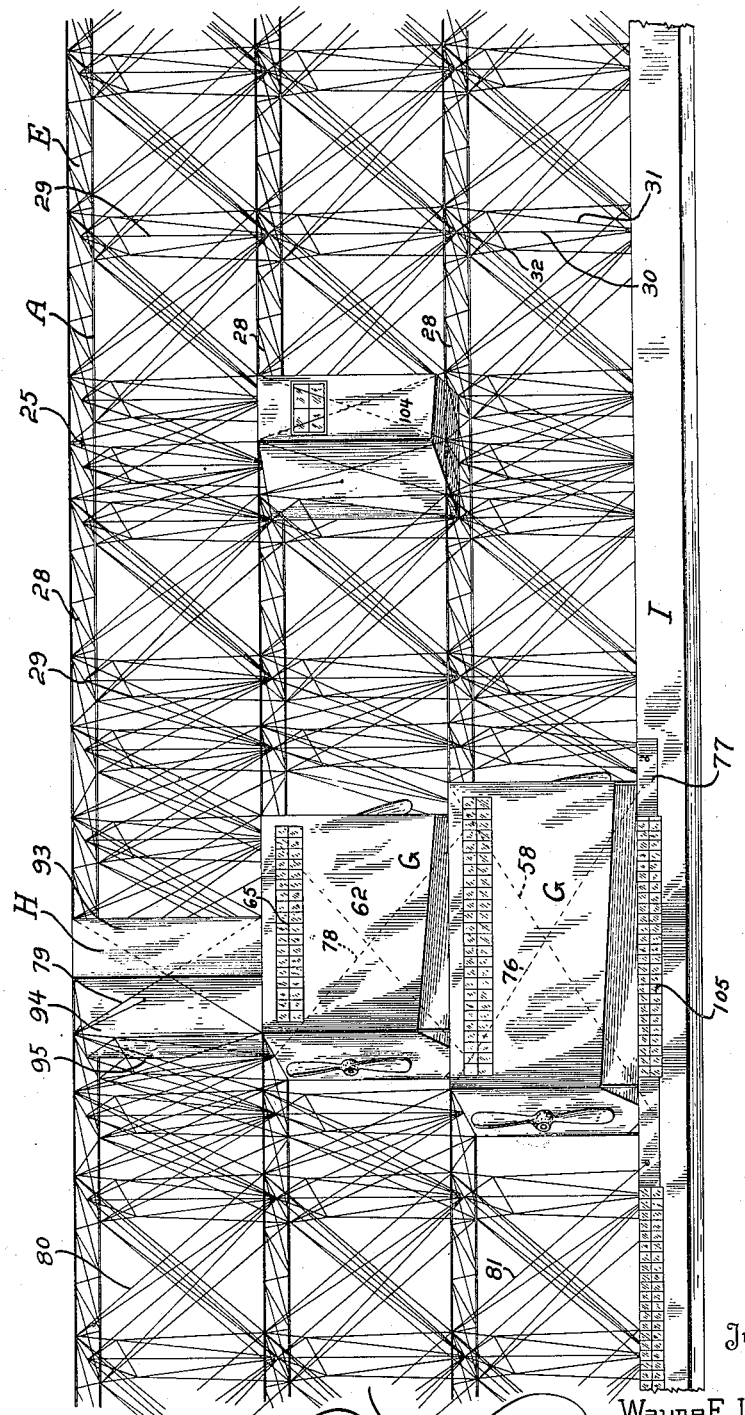

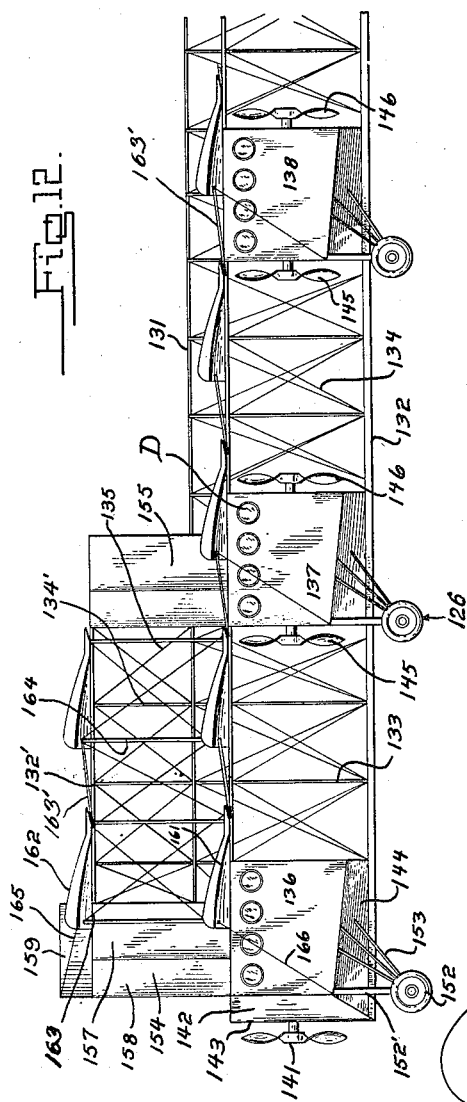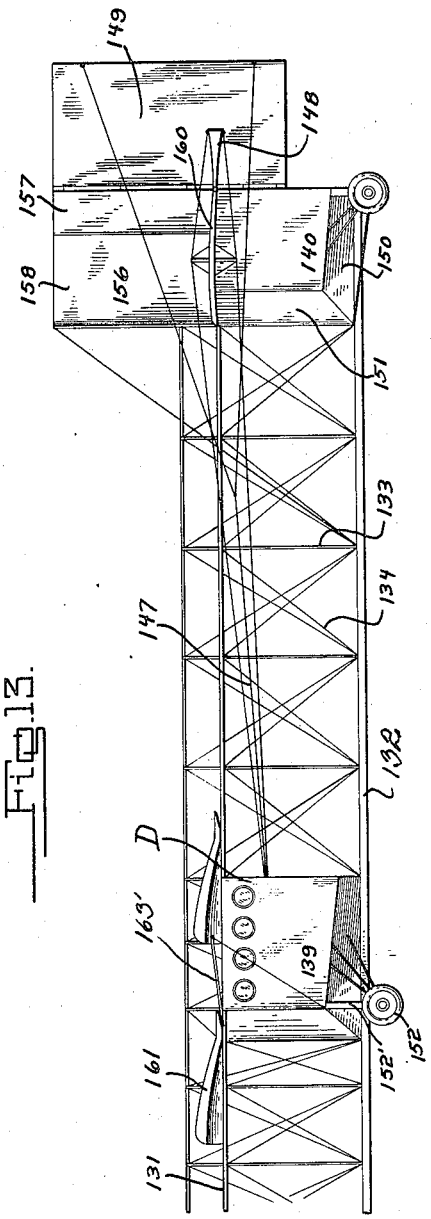

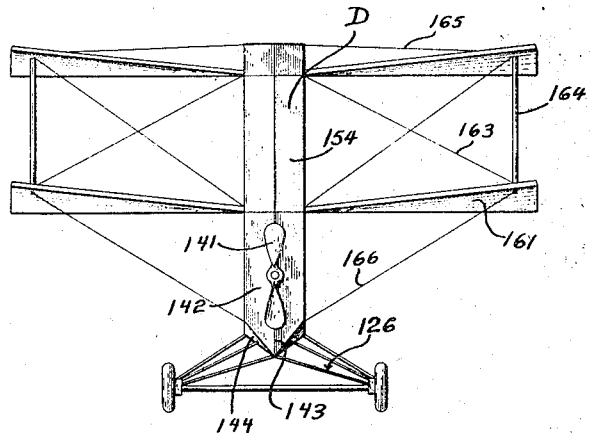
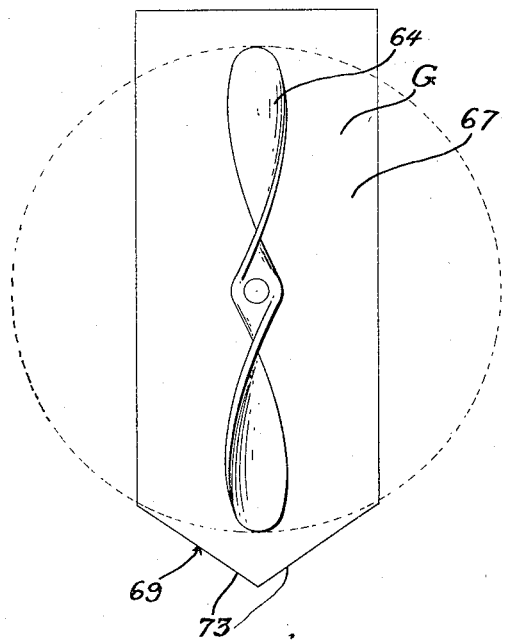
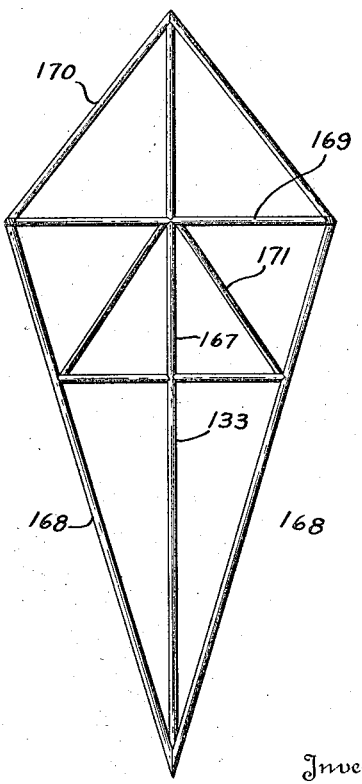

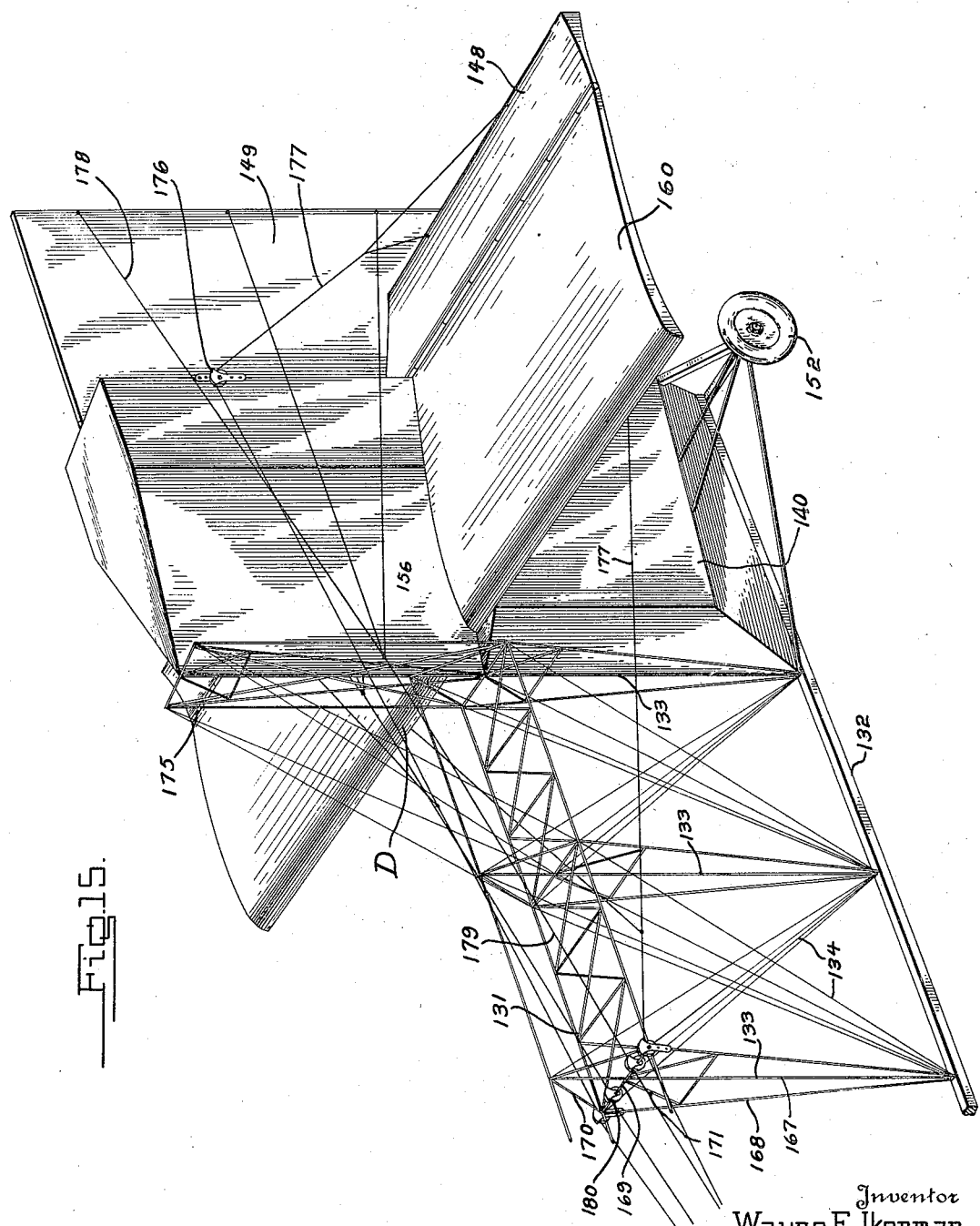

July 1, 1924.

W. E. IKERMAN

AERIAL TRAIN

Filed Oct. 7, 1922

Inventor
Wayne E. Ikerman
By Lancaster and Allwine
Attorneys

Patented July 1, 1924.

1,499,825

UNITED STATES PATENT OFFICE.

WAYNE E. IKERMAN, OF LONG BEACH, MISSISSIPPI, ASSIGNOR OF FORTY ONE-HUNDREDTHS TO BERNHARD REINIKE AND FIVE ONE-HUNDREDTHS TO FREDERICK IKERMAN, BOTH OF LONG BEACH, MISSISSIPPI.

AERIAL TRAIN.

Application filed October 7, 1922. Serial No. 593,005.

*To all whom it may concern:*

Be it known that I, WAYNE E. IKERMAN, a citizen of the United States, residing at Long Beach, in the county of Harrison and State of Mississippi, have invented certain new and useful Improvements in Aerial Trains, of which the following is a specification.

This invention relates to air craft of the heavier than air type and is an improvement on my allowed application for aerial trains, filed July 8, 1920, Serial No. 394,635, and the primary object of the present invention is to provide an improved air ship structure for carrying a large number of passengers or a great quantity of freight, which will be stable in flight, easy to control, and capable of maintaining a great speed with a maximum amount of safety.

Another prime object of the invention is to provide a novel means of bracing the improved air ship and all parts thereof, so that a strong and durable construction will be had, which will be perfectly balanced, thus rendering the airship stable in flight, the main longerons or longitudinal spars and the main vertical compression struts being disposed out of the direct path of the wind forces, thereby effectively diminishing the head resistance of the improved airship, and eliminating unnecessary strain on the frame work thereof.

A further object of the invention is to provide an improved air ship embodying a plurality of collinear arranged nacelles or coaches for the passengers and freight, the coaches, or certain of the coaches carrying pusher and tractor propellers for driving the airship through the air, and a plurality of wings or aerofoils braced and connected together in a novel manner.

A further object of the invention is to provide novel means for arranging the pusher propellers so that the blades thereof will always be disposed in an equal air stream, whereby the propellers will act equally upon the air, thus effectively balancing the propellers, preventing an unbalanced strain thereon and unnecessary strain on the engines, and insuring maximum benefits therefrom.

A further object of the invention is to provide novel means for forming the nacelles or coach bodies, whereby the same will form a stream line front for dividing the air stream of the tractor propellers, the coach bodies being so formed as to direct the air under the sustaining aerofoils or wings, and causing an equal air stream on each side of the body for the blades of the pushing propellers to act in, when such are provided.

A further object of the invention is to provide novel vertically disposed stabilizers preferably carried by the nacelles or coach bodies and disposed at appropriate points throughout the length of the air ship, said stabilizers preventing side sway and lateral shifting of the air ship, and forming means for dividing the air currents and directing the same under the sustaining wings or aerofoils.

A further object of the invention is to provide novel means for arranging the longerons and the compression vertical struts directly in rear of the said coach bodies and vertical stabilizers, whereby the said longerons and compression struts will be out of the direct path of the wind resistance.

A further object of the invention is to provide novel means for arranging the wings or sustaining aerofoils for the airship, the wings being arranged in spaced relation throughout the length of the airship to permit the maximum benefit to be obtained therefrom and to permit a perfect balance to be had by the air ship, the aerofoils and supporting wings being spaced at the longitudinal center of the airship or at the point of disposal of the nacelles or coach bodies and the stabilizers, whereby the stabilizers are permitted to engage the airstream with maximum benefit to part and guide the same under the sustaining aerofoils and wings, said open spaces also tending to stabilize the airship and decrease the weight thereof.

A further object of the invention is to provide improved sustaining aerofoils or wings for the airship, the trailing edges of the aerofoils being disposed below or in alignment with the lower surface of the leading edge of the following aerofoils, the trailing edges being so shaped as to direct the major portion of the air stream under the following aerofoils to permit all of the aerofoils to efficiently act upon the air stream, all of the aerofoils being cambered from their leading edges to a point short of their trailing edges, the portions of the aerofoils in the rear of the cambered portions thereof being disposed in a horizontal plane and then inclined upwardly to their trailing edges, said surfaces tending to guide the air back and up under the following aerofoils, and giving the air stream a wave like motion, the peaks of which tend to act upon the cambered surfaces of the aerofoils to cause the lifting and sustaining of the airship.

A further object of the invention is to provide an improved aeroplane embodying a plurality of collinear arranged coaches or nacelles connected and placed together in novel manner, stabilizers carried by the coaches for preventing lateral shifting or side slide of the machine, and sustaining surfaces associated with the coaches or nacelles and supporting framework therefor, the construction of the airship being such that the same can be either of the monoplane or multiplane type and either of the land or water type.

A further object of the invention is to provide a novel center ship and side floats for the airship when the same is of the water type, said center ship and side floats being constructed so as to divide and cut through the air stream and water, and to permit the easy gliding of the machine over the surface of the water, the center ship and side floats being also so shaped as to permit the easy rising of the airship from the water without the natural adhesion of the water thereto.

A further object of the invention is to provide a novel means for arranging the coaches or nacelles one upon the other, when the airship is of a relatively large type, the coach bodies being so arranged that the propellers carried thereby will not interfere with one another, and will not interfere with the action of each other in the air stream.

A further object of the invention is to provide a novel means for incorporating an improved stabilizer which has great stabilizing capacity with the empennage of the aeroplane whereby the maximum benefit will be derived from the rudder and elevators of the airship.

A further object of the invention is to provide an airship of the above character, in which the center ship and side floats are so constructed that the necessity of projecting the same beyond the front end of the air ship is eliminated, thereby reducing the head weight of the airship and reducing the likelihood of the airship nose diving and permitting the front end of the machine to rise easily on the initial take off, the sustaining aerofoils being disposed at the start of the floats to effectively support the weight thereof.

A still further object of the invention is to provide an airship so constructed and arranged that not only is the airship permitted to rise nose first, but is permitted to land at an angle to the horizontal with its tail end lowermost so as to permit the easy landing of the airship without jar.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a perspective view of the forward end of the airship, of the seaplane type, constructed in accordance with my invention and embodying a novel center ship and novel side floats, the center ship and side floats each carrying a plurality of the novel coaches.

Figure 2 is a perspective view of the intermediate portion thereof.

Figure 3 is a perspective view of the rear or tail end portion thereof.

Figure 4 is a top plan view of the improved aeroplane of the type illustrated in Figures 1, 2, and 3, a portion being broken away and removed to condense the view.

Figure 5 is a perspective view of the forward end of an airship constructed in accordance with this invention of the seaplane type, embodying a center ship and side floats, the nacelles or coaches being all disposed directly above the center ship, the outer floats acting in the nature of out riggers, the sea plane being shown of the multiplane type.

Figure 6 is a fragmentary side elevation of the forward end of an airship of the seaplane type, the nacelles or coach bodies being all disposed above the central ship, the airship being shown of the combined triplane and biplane type.

Figure 7 is a fragmentary side elevation of the rear end of the last mentioned airship.

Figure 8 is an enlarged fragmentary perspective view of the airship of the seaplane type, showing the novel frame work for the airship, and the novel means for bracing the same.

Figure 9 is a fragmentary detail front elevation of one of the vertical compression struts for connecting the center ship with the longitudinally extending longerons or spars of the airship.

Figure 10 is a fragmentary detail front elevation of one of the side compression struts for connecting the wings with the side floats, when the same are in the nature of outriggers.

Figure 11 is a fragmentary plan view of a land plane constructed in accordance with the invention having a single row of longitudinally aligned nacelles or coach bodies, the airship being of the combined monoplane and biplane type.

Figure 12 is a fragmentary side elevation of the forward end of this type of aeroplane.

Figure 13 is a fragmentary side elevation of the rear end of this type of aeroplane.

Figure 14 is a front elevation of the same.

Figure 15 is an enlarged perspective view of the rear end of this type of aeroplane showing the improved control with the safety pulley which is similar to or substantially the same as the control shown in Figures 1 to 4 inclusive and showing the novel means for combining the stabilizer empennage, elevator and rudder.

Figure 16 is a detail side elevation of one of the compression strut members utilized for connecting the keel with the longitudinally extending longeron or longitudinally extending spar, of the airplane or aerial train.

Figure 17 is a rear end elevation of one of the nacelles or coach bodies, showing the means of mounting the pusher propeller thereon, whereby the propeller blades will be equally disposed in the air-stream.

Figure 21 is a diagrammatic view, showing the wing or aerofoil arrangement, whereby the air stream will be directed from the leading aerofoil under the following aerofoil, the aerofoils shown being of the type utilized for obtaining speed.

Figure 22 is a similar view, showing the type of aerofoils used when the carrying of weight is more essential than attaining a high speed.

Figure 18:
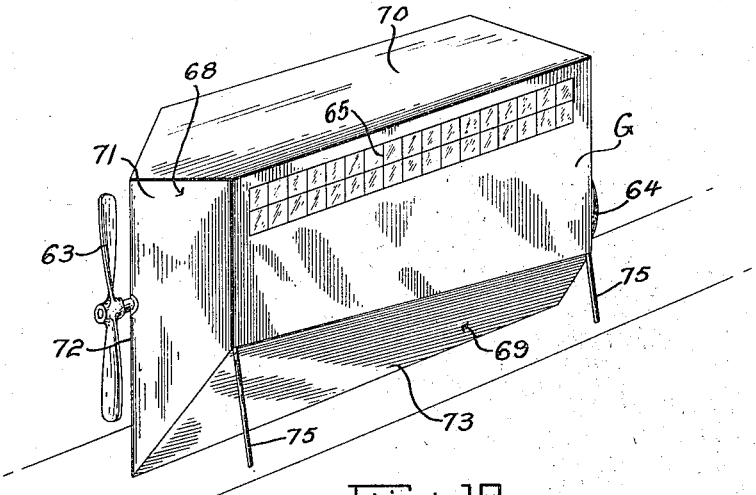
Figure 18 is a perspective view of one of the nacelles or coach bodies.
Figure 19:
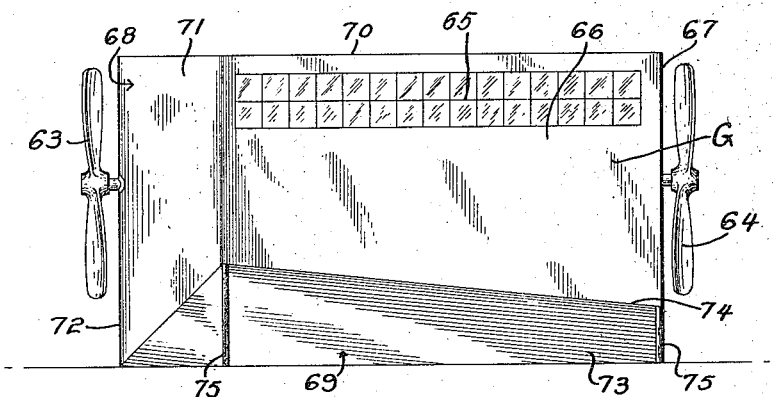
Figure 19 is a side elevation of the same.
Figure 20:
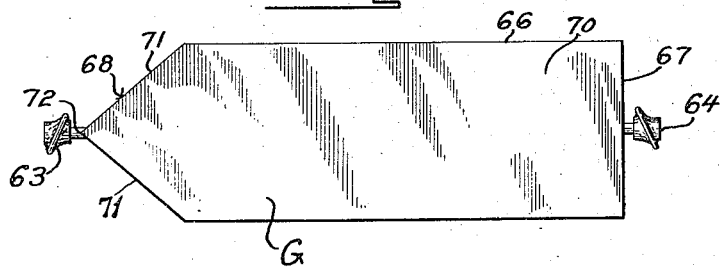
Figure 20 is a top plan view of the same.

Referring to the drawings in detail, wherein similar reference characters designate corresponding parts throughout the several views, the letter A generally indicates a multiplane airship or aerial train of the seaplane type, having a plurality of rows of collinear nacelles or coach bodies arranged above the center ship and side floats; B, a multiplane aeroplane of the seaplane type, showing a single row of collinear coaches arranged directly above the intermediate or central ship; C, a combined triplane and biplane of the seaplane type, showing a single row of coaches arranged above and carried by the center ship; and D, a combined monoplane and biplane aeroplane or aerial train of the land going type, showing the single row of collinear nacelles or coach bodies.

All of the types A, B, C, and D embody the main features of the invention and simply illustrate the means of applying these main principles to different types of aerial vehicles.

The improved air vehicle or aerial train, designated by the reference character A includes essentially the frame E; the sustaining surfaces F; the nacelles or coach bodies G; the stabilizers H; the center ship and side floats I, J and K; the empennage L; the elevator M; and the rudder N.

The frame E includes the central frame 25 arranged above the central ship I and the side frames 26 and 27 arranged above the side floats J and K. The central frame 25 and the side frames 26 and 27 each include the longitudinally extending spars or longerons 28 which extend the full length of the aerial train or air vehicle. These longitudinally extending spars or longerons 28 are preferably of a truss construction preferably built up of structural steel and are disposed one above the other in spaced vertical alignment. There may be as many of these longitudinally extending spars or longerons 28 disposed in vertical alignment as is considered necessary according to the height of the improved airplane or vehicle and the number of planes or sustaining surfaces to be carried thereby. Disposed in spaced relation longitudinally of the air vehicle or aerial train A, in longitudinal alignment, are the vertical compression strut members 29 which are also of a truss construction preferably built up of structural steel. As shown in the drawings, these vertical struts consists of tubes or rods suitably connected together. These vertical struts 29 extend upwardly from the center ship I and the side floats J and K to the uppermost longitudinally extending spars or longerons 28. The lower terminals of these vertical struts are connected to reinforced portions of the center ship and side floats, and as shown in Figure 9 of the drawings, the same each include a central rod 30 extending up from the center ship and side floats, and diverging side bars 31 extending up from the center ship and side floats. The center bar 30 and the diverging side bars 31 are secured to a horizontal rod 32, and these bars 30, 31 and 32 may be further braced by means of brace bars 33. Extending up from the center ship and side floats are side supporting bars 34 which are secured to the side bars 31 at a point intermediate their ends. The horizontal bar 32 in turn supports a central bar 35, which may form a continuation of the central bar 30, diverging bars 31', and side supports 36 which are similar to the side supports 34. This construction is duplicated for the entire height of the compression struts, as can be readily seen by referring to Figures 1, 2, and 3 of the drawings. The frames 25, 26, and 27 formed by the longitudinally extending spars 28 and the vertically extending compression struts 29 can be suitably connected together by transversely extending spaced rods or spars if so desired, and the sustaining surfaces F form additional means for connecting these frames together.

In view of the fact that the side floats J and K, which will be hereinafter more fully described, terminate short of the rear end of the central ship I, the side frames 26 and 27 terminate short of the central frame 25, as can be readily seen by referring to Figures 1, 2, and 3. The central frame 25 supports the empennage L, the rudder N and the elevators M, as can also be clearly seen by referring to Figure 3 of the drawings. The frames 25, 26 and 27 are so arranged that they will be out of the airstream formed by the air vehicle or aerial train, as will be hereinafter more fully apparent, and this arrangement forms an important feature of my invention.

The sustaining surface F includes a plurality of transversely extending banks of aerofoils 40, which are arranged in spaced relation longitudnally of the air vehicle, and as shown, these banks of aerofoils 40 start directly at the front of the air vehicle and end at a point adjacent to the rear ends of the side floats J and K. It can be seen that the central frame 25 projects rearwardly of the banks of aerofoils 40 and supports the tail of the air vessel. There may be as many superposed aerofoils in each bank of aerofoils as desired, and as shown in the form A of my invention, I have provided a multiplane air vessel, in which certain banks of aerofoils include four superposed aerofoils, and other include three superposed aerofoils. These banks of aerofoils 40 extend intermediate the frames 25, 26 and 27, as at 41 and 42, and outwardly and upwardly from the side frames 26 and 27, as at 43 and 44. Spaces 45 are left between the portions of the aerofoils 41, 42, 43 and 44 as can be clearly seen by referring to Figures 2 and 4 of the drawings, and these spaces 45 are in direct alignment with the frames 25, 26 and 27. In these spaces are disposed the nacelles or coach bodies G and stabilizers H, and if so desired, the aerofoils can be suitably connected to the coach bodies or nacelles and to the stabilizers. It is to be also understood that these aerofoils are suitably braced internally, if so desired, and suitably connected to the frames 25, 26 and 27. By leaving the open spaces 45, the aircraft is considerably lightened and permits the perfect balance thereof to be had. The banks of aerofoils 40 are connected together by rods 46 and the aerofoils in each bank are connected together by vertically extending compression bars or struts 47. These aerofoils as well as the frames 26, 27 and 28 are suitably braced and connected by tension cables which will be hereinafter more fully described.

The aerofoils are of a novel configuration and form an important feature of my invention, and as shown in Figures 21 and 22, each aerofoil includes a forward cambered portion 48 extending from the leading edge thereof to a point short of the trailing edge thereof. Directly in rear of the cambered portion of the aerofoil, the same extends forwardly in a horizontal plane, as at 49 for a short distance, and then inclines upwardly and rearwardly as at 50 to its trailing edge.

This novel construction permits the aerofoils to engage the air stream for lifting and sustaining the air vessel or aerial train and to then guide and deflect the major portion of the air stream back and under the following aerofoils. It can be seen that the trailing edge of the aerofoils are below the leading edge of the following aerofoils. The cambered portion 48 of the aerofoils acts and has the same function as the ordinary aeroplane wings, that is for lifting and sustaining the aerofoil while the horizontal portion 49 tends to shoot and direct back the air stream, while the inclined portion 50 tends to direct the airstream back at a slight incline under the following aerofoil. This novel construction moves out the air stream and tends to give the same a steady wave like motion, the peaks of which engage under the cambered portion 48 of the aerofoils for lifting and sustaining the airship. As shown in Figure 21 of the drawings, the cambered portions 48 are of a relatively small chord and thus these aerofoils are particularly adapted for use on air vessels, which are intended for high speed. The aerofoils, disclosed in Figure 22, have the cambered portion 48 thereof provided with a relatively large chord, as indicated by the reference character 51, and thus these aerofoils are particularly adapted for use on aircraft intended for carrying great weights, and for relatively low speed. This cambered portion can, of course, be varied to suit different conditions and to suit different types of my aircraft as disclosed.

The nacelles or coach bodies G in the type A of my aircraft are arranged above the center ship I and side floats, J and K, and these nacelles or coach bodies G are not all of the same configuration, and it is also preferred that the coach bodies or nacelles G which are arranged above the central ship I, be formed relatively larger than the nacelles or coach bodies G carried by the side floats J and K. These nacelles or coach bodies G are arranged in collinear spaced relation and start at the front of the aircraft and continue on back toward the rear end of the aircraft. Referring to Figures 1 and 2 of the drawings, it can be seen that there are three intermediate nacelles or coach bodies G, as indicated by the reference characters 55, 56, and 57, three rear nacelles or coach bodies as indicated by the reference characters 58, 59 and 60, and front nacelles G indicated by the reference characters 52, 53 and 54, which are carried by the forward terminals of the center ship I and the side floats J and K, and the stream line configuration of these nacelles, which will be hereinafter more fully described, merge into the stream line configuration of the center ship I and the side floats J and K, which will also be hereinafter more fully described. The central intermediate and central rear nacelles or coach bodies indicated by the reference characters 55 and 58 are disposed directly above and connected with the intermediate portions of the central ship I, and these nacelles or coach bodies are formed relatively long and may have disposed on top thereof, other coach bodies or nacelles, as indicated by the reference characters 61 and 62. These coach bodies or nacelles indicated by the reference characters 61 and 62 are arranged in novel relation to the nacelles or coach bodies indicated by the reference characters 55 and 58, in order that the pusher propellers carried by the said nacelles or coach bodies indicated by the reference characters 55, 58, 61 and 62 can be used to the best advantage. Now, as intimated, it can be seen that all of the nacelles or coach bodies G are provided with forward tractor propellers 63 and rear pusher propellers 64. These nacelles are so constructed and the pusher propellers so arranged in relation thereto that the pusher propellers 64 will be perfectly balanced and permitted to engage in equal air streams, on opposite sides of the nacelles.

These nacelles or coach bodies are fitted out similar to the ordinary railway train coaches in so far as possible, and are provided with any preferred type of window lights 65. The engines for driving the tractor and pusher propellers 63 and 64 may be arranged in any preferred manner in the coach bodies, but preferably adjacent to the lower sides thereof, so that the center of gravity will be relatively low in the aircraft. While in the drawings, I have shown all of the nacelles or coach bodies G provided with driving and tractor propellers, it is to be understood that certain of the coach bodies or nacelles can be used simply as passenger or freight coaches and the driving means thereof can be eliminated. While I have not shown which of the nacelles or coach bodies are for carrying passengers or freight, it is to be understood that some of the coach bodies can be used only for freight and some only for passengers, or parts of the nacelles or coach bodies can be used for freight and the other parts for passengers.

In view of the fact that the configuration of the nacelles or coach bodies G are substantially the same, only one nacelle or coach body will be described, in detail; but it is to be clearly understood that while all of the V-shaped bottoms of the nacelles or coach bodies incline rearwardly, the V-shaped bottoms of the coaches or nacelles which carry tractor and pusher propellers incline downwardly and rearwardly at the rear ends to a greater extent than the coaches which only carry the tractor propellers. By referring to the detail views of the coaches, it can be seen that each nacelle or coach body G comprises parallel side walls 66, a rear wall 67 which can be of a flat configuration; a front wall 68, a bottom wall 69, and a flat top wall 70. The front wall 68 consists of two converging side plates 71 which provide a centrally disposed vertically positioned sharp air cutting edge 72 and these diverging plates 71 extend back from the sharp leading edge 72 to the side walls 66 and form means for dividing the air stream for flow back under the wings or banks of aerofoils 40. The bottom wall 69 also includes a pair of inclined plates 73, which incline downwardly and inwardly toward the longitudinal center of the nacelles or coach bodies G and the side plates 66. This forms a substantially V-bottom on the coaches and as these side plates 73 decrease in width toward their rear ends, as indicated by the reference characters 74, it can be seen that the air will be forced downward in an inclined direction which will also tend to support the nacelle bodies to a certain extent.

As clearly shown in the drawings, the nacelles or coach bodies are connected with the center ship I and side floats J and K by suitable stay rods or the like 75, and the coach bodies can be internally braced in any preferred manner. The tractor propellers 63 are of course disposed at the leading sharp edge 72 of the nacelles or coach bodies G, while the pusher propellers 64 are disposed at the rear end of the nacelles or coach bodies G at the longitudinal axes thereof. The tips of the blades of the pusher propellers 64 will project equal distances beyond the side faces or walls 66 of the nacelles or coach bodies, and as the air is equally divided by the side plates 71 of the front wall 68, the propeller blades will act in equal air streams and thus be perfectly balanced, preventing unbalanced strain on the propeller and undue strain on the engine.

The formation of the nacelles and the arrangement of the propellers in relation thereto forms an important part of my invention as hereinbefore suggested.

The nacelles or coach bodies 61 and 62 are formed relatively shorter than the nacelles or coach bodies 55 and 58, and thus the forward and rear ends thereof terminate inwardly of the front and rear ends of the nacelles or coach bodies 55 and 58. Thus the tractor and pusher propellers carried by the nacelles or coach bodies 61 and 62 will not be in the same plane as the propellers carried by the nacelles or coach bodies indicated by the reference characters 55 and 58 and will not interfere with one another.

As clearly shown in Figure 8 of the drawings, diagonally extending longitudinally disposed tension cross wires or steel rods or cables 76 are extended through the lower nacelles or coach bodies G. These cables or steel rods have their lower terminals connected to suitable reinforced members 77 carried by the central ship and side floats, and the upper terminals thereof are connected to adjacent vertical strut members 29. The upper nacelles or coach bodies 61 and 62 are also preferably braced in the same manner by similar cables or steel rods 78, and these cables or steel rods are connected to adjacent vertical struts 29 and the longitudinally extending main spars or longerons 28. If so desired, the stabilizers can also be braced by similar diagonally extended cross cables or steel rods 79 which also can be connected to adjacent longitudinally extending spars 28 and vertical strut members 29.

As heretobefore suggested, the longitudinally extending spars or longerons 28 and the vertical strut members 29 are braced and connected by diagonally extending tension cables or steel rods 80; and these tension cables may extend from one vertical compression member or strut 29 to another and from one longitudinally extending spar or longeron 28 to the other. The lowermost longitudinally extending spars are also braced by similar cables or steel rods 81, which are connected to the reinforced fastening parts of the central ship and side floats. The aerofoils are also braced by diagonally extending crossed transversely disposed tension cables 82 which extend from the compression struts 47 to the stablizers H, to the vertical main struts 29 and the longitudinally extending main spars 28. The extreme upper ends of the stabilizers H which will be later described in detail are also braced by similar transversely extending inclined tension wires 89. While I have disclosed a preferred way of bracing the stabilizers, the coaches or nacelles G, the longitudinally extending spars 28, and the vertical struts 29, it is to be understood that the same can be braced by other arrangements of tension cables or steel rods, and that these cables, steel rods, or wires are placed at the points where the most advantage will be derived therefrom and where undue stress is likely to occur. It is also preferred to brace the aerofoils by inclined wires or tension cables 90 which extend transversely of the aerofoils and longitudinally of the path of flight.

The stabilizers H form an important feature of my invention and by means of the improved stabilizers, the wind stream is divided to the best advantage and forced under the aerofoils and lateral sway and side slip of the air-craft is prevented. These stabilizers also form another important feature, as the same are disposed in the spaces 45 between the aerofoils and directly in longitudinal alignment with the longitudinally extending spars 28 and the main compression struts 29, and thus tend to guard these members and prevent them from offering any appreciable head resistance to the flight of the aircraft.

As clearly shown in the drawings, these stabilizers H extend upwardly from the nacelles or coaches G and terminate at a point above the banks of aerofoils 40. There is also a stabilizer, as indicated by the reference character 91, disposed at the tail end of the machine, and this stabilizer supports the empennage L and the rudder N, as will be hereinafter more fully described. The combination of this stabilizer 91, the empennage L, the elevators M, the rudder N and the guide pulleys 103' and 104' also form an important feature of my invention.

These stabilizers H include parallel side walls 93 and converging front plates or walls 94 which define a vertically disposed centrally positioned sharp leading edge 95, which tends to cut the air current and direct the air currents under the banks of aerofoils 40. The converging front walls 94 and the flat side walls 93 act in the nature of true stabilizers, and thus tend to prevent lateral swaying of the machine and side slip thereof when the machine is banking. The rear walls of these stabilizers can be formed flat or with a plane surface. These stabilizers may be suitably braced internally by a framing or truss structure and can be covered with some suitable light material, such as balloon cloth or the like, and are connected directly with the vertical compression struts 29 and the longitudinally extending main spars or longerons 28.

The stabilizers, which are disposed at the central portion or longitudinal axis of the aircraft, can be provided with an extension 97, and this extension projects above the aerofoils and the sides thereof inclined rearwardly from the front leading edge to the rear wall. If so desired, only the front centrally disposed stabilizer can be provided with this extension.

The rear stabilizer, indicated by the reference character 91 is carried by the rear end of the center ship I and is of course constructed substantially the same as the stabilizers heretobefore described, but it is to be clearly understood that the rear end or tail stabilizer has a greater stabilizing effect than the other stabilizers, as it can be seen by referring to the drawings, that the relatively tall, elongated vertically disposed forwardly extending converging front plates project out to a greater extent than the other stabilizers; thereby, the said front plates and the parallel side walls, define means for insuring a true stabilizing balance for the tail plates, elevators and rudder. This stabilizer also extends above the framing E at the rearmost compression or vertical strut 29, as at 98 in order to form an effective means for bracing said stabilizer indicated by the reference character 91. As heretobefore stated, this stabilizer carries the empennage L, which consists of a plurality of superposed planes 99, which are constructed substantially the same as the banks of aerofoils 40 with the exception that the rear deflecting surface thereof is eliminated. These planes 99 are suitably connected together by vertical compression struts 100 and braced by diagonal tension cables 101.

The two uppermost planes 99 carry the elevators M which are of a novel construction. These elevators M are of course hingedly connected to the trailing edges of the two uppermost planes, and when these elevators M are viewed in end elevation or cross section they are of substantially fish tail configuration. Now, it is obvious by this configuration of the elevators, the same do not have to be swung upwardly or downwardly to any great extent when desired to ascend or descend, and thus the inactive surfaces of these elevators will be effectively out of the wind stream during the ascending or descending of the aircraft.

Disposed directly at the longitudinal center of the stabilizer indicated by the reference character 91 is the rearwardly extending flat rudder N hingedly connected to the stabilizer. The rudder N and the elevators M are controlled by suitable cables or pull ropes 102 and 103 respectively, which are trained about suitable guide pulleys 103' and 104', and these pull ropes can also be trained about guide pulleys 105' which are hingedly connected to the central longitudinally extending frame 25 whereby a better leverage is obtained by the pull ropes 102 and 103; which cables lead to a suitable control cab 104 disposed in the central longitudinally extending frame 25 in rear of the rearmost nacelle or coach body G. This control cab 104 is braced or secured in any preferred manner to the longitudinally extending spars or longerons 28 and the vertical compressions or struts 29.

The center ship I and the side floats J and K also form an important part of my invention, but it is to be also understood that the center ship and floats can also be dispensed with and landing wheels or undercarriage substituted therefor.

As heretobefore stated, the central ship I extends from the extreme front of the aircraft to the extreme rear end thereof, while the side floats J and K extend from the extreme front end of the aircraft and terminate at a point short of the rear end thereof. The center ship I can also be used for carrying all of the passengers and freight and it is preferred to provide the same with suitable window glasses or the like 105. By referring to the drawings, it can also be seen that the front and rear ends of the center ship I and the side floats J and K curve upwardly as at 106 and 107. This provides means for facilitating the rising and alighting of the aircraft on the water. The bottoms of the center ship and floats are V-shaped and tend to divide the water and air with little resistance. These front curved ends 106 of the center ship and side floats support the V-shaped bottoms of the forward nacelles indicated by the reference characters 52, 53 and 54, and thus merge into the stream line configuration of said nacelles and the center ship and side floats. Owing to the construction of the center ship and side floats, the airship can glide over the water at a high rate of speed and the V-shaped bottoms thereof will prevent the natural adhesion of the water thereto when the plane or aircraft is rising from the water. The extreme ends of the center ship I and the side floats J and K are provided with rearwardly extending flat tail extensions 109 which act as stabilizing surfaces upon the water. The central ship I can have its extension 109 provided with a water rudder 110 which can also have attached thereto suitable control cables or pull ropes 111 which can lead to the control cab 104.

From the foregoing description of the form A of my invention, it can be seen that a novel aircraft has been provided, which is capable of carrying a large quantity of freight and passengers and which is so constructed that the tipping over of the machine by the carrying of large outwardly extending central ship and side floats at the forward end thereof is eliminated. In view of the fact that the planes or aerofoils 40 start at the front end of the machine, the easy rising of the machine from the water is facilitated, and makes the controlling of the machine by the elevators M easily accomplished.

In this type of aerial train in which the nacelles or coach bodies G are disposed above the central ship and side floats, and all the other types of my invention, it can be seen that the vertically disposed converging front walls and the side walls of the stabilizers including the longitudinally extending side walls of the nacelles or coach bodies act as supporting wings or aerofoils, which construction, when the aeroplane is banking, with the weight of the engines, passengers, and freight carried in the lower coaches and the central ship, prevents side slipping, so that the aerial train will quickly right itself.

In the forms B and C of the improved airship, I eliminate the coach bodies or nacelles G above the side floats J and K. Otherwise, the aircrafts B and C are of a slightly smaller overall dimension than the form A, and as the floats J and K are of the lighter construction, the bracing thereof is of a different construction. At the extreme forward ends of the floats J and K are provided inwardly extending inclined brace rods 112 which lead to suitable advantageous points on the forward nacelle or coach body G, which for the sake of clearness is also indicated by the reference character 113. I provide novel side compression strut members 114 for connecting the side floats J and K with the banks of the aerofoils, and as shown these compression members extend up from the floats J and K to the lowermost aerofoil of the banks of aerofoils. As shown, these compression members are of a substantially diamond shape when viewed in front elevation and consists of a central rod or compression member 115 and a centrally disposed horizontal member 116. Extending from the terminals of the vertical member 115 to the terminals of the horizontal member 116 are the inclined side bars 117. This frame can be suitably internally braced by short brace bars 118. As stated, the upper ends of these compression struts 114 are connected to the lower aerofoils and the upper aerofoils are braced by the vertically extending strut members 119. These enlarged compression strut members 114 are also further braced by inclined side bars 120 and are only placed at points on the aircraft which will be subjected to the most strain, such as the front end thereof. At the intermediate and rear portions of the float, only the vertically extending compression bars 121 are provided, the lower terminals of which can be braced by side inclined bars 122.

The side float compression members and aerofoils in these forms B and C are braced in the same manner by tension cables and steel rods, as in the form A just described, and the banks of aerofoils are connected together by the longitudinally disposed rods or bars 123, as in the form just described.

Now, in the form B I have disclosed a combination quadriplane and triplane, while in the form C I have shown a combination triplane and biplane. This is the only difference between these two forms of my invention, and it is obvious that the aircraft can be made in different sizes to suit varying conditions and that the means of strengthening and bracing the various parts thereof can be varied according to the size of the aircraft.

In the form D, I have shown the principles of my invention applied to a plane of a relatively small type and provided with a wheeled under carriage 126. While I have shown the wheeled under carriage 126 only applied to a relatively small aircraft embodying the features of my invention, it is to be also understood that the wheeled undercarriage can be utilized with the relatively large types of aircraft embodying the features of my invention.

This form D of my invention includes essentially the main longitudinally extending spar or longeron 131, and a longitudinally extending keel 132 which can be, but not necessarily is, of a brace or truss construction. As shown, this keel is of a solid construction. The keel 132 is connected to the longitudinally extending spar or longeron 131 by means of vertical struts 133 which can be in the nature of rods, if so desired, and the whole resultant frame is braced by diagonally extending tension wires 134. The extreme forward end of the machine is provided directly above the main longitudinally extending spar 131, with the relatively short longitudinally extending spar 132′ which serves as means for supporting a portion of the front part of the aeroplane which will be hereinafter more fully described. This relatively short longitudinally extending spar 132′ is braced by vertical struts or compression members 134′ which may form a continuation of the compression members or struts 133. This upper construction is also braced by diagonally extending wires 135.

A plurality of coach bodies or nacelles 136, 137, 138 and 139 are arranged in spaced collinear relation throughout the length of the airplane, and as shown a rear body 140 is provided which can act in the nature of a stabilizer. The forward nacelle or coach body 136 carries a tractor propeller 141 and the front end of this nacelle or coach body is provided with converging side plates 142 which provides the leading sharp edge 143 which divides the air stream and directs the same under the sustaining surfaces of the aeroplane. The lower surface of all of the nacelles or coach bodies are of a V-shape as indicated by the reference character 144, and the V-shaped bottoms decrease in height toward the rear ends thereof in order to provide a downwardly inclined surface. The forward faces of the bodies or nacelles 137 and 138 can be provided with flat faces if so desired, or they can be formed with a cutting edge similar to the forward coach body 136. The two intermediate coach bodies 137 and 138 are provided both with tractor and pusher propellers 145 and 146, as can be clearly seen by referring to the drawings. The rear coach body 139 is formed with a leading sharp edge as it is in the nature of a passenger and control cab and the control cables 147 for elevators 148 and rudder 149 extend into the same. The rear body 140 is also provided with a V-shaped bottom 150 and the converging front plates 151.

All of the coach bodies carry landing wheels 152 which form the undercarriage 126 and these wheels are suitably braced and connected to the supporting frame and to the nacelles coach bodies 136, 137, 138 and 139 and to the body 140. As shown, the same are braced by supporting posts 152' and by inclined brace bars 153.

The two forward coach bodies 136 and 137 and the rear body 140 carry stabilizers 154, 155 and 156. These stabilizers are constructed similar to the stabilizers H in the other forms of my invention previously described, and may be provided with flat side plates 157 and inclined front plates 158 which form a sharp leading edge which divides the air current and directs the same under the sustaining surfaces. The forward stabilizer 154 is provided with an extension 159 which extends above the sustaining surfaces and which acts as a fin. The rear stabilizer 156 has connected thereto the rudder 149 which is controlled by the cables 147 heretobefore mentioned. The rear stabilizer 156 also carries an empennage or single tail plane 160, and this empennage or tail plane has hingedly connected thereto the elevator 148, which is controlled by cables 147. This elevator is of the same construction and acts in the same manner as the elevators M heretobefore described.

The sustaining surfaces for the aircraft consist of a plurality of spaced lower aerofoils 161 and a pair of upper aerofoils 162. These aerofoils 161 and 162 are constructed identically the same as the aerofoils heretobefore described and also deflect and guide the air stream back under all of the following aerofoils. As shown these aerofoils gradually incline upwardly and outwardly from the central axis of the aeroplane.

These wings or aerofoils are braced by diagonally extending cross wires or tension cables 163 and the upper and lower planes 162 and 161 are connected by compression struts 164. The areofoils are connected together one with the other by relatively short longitudinally extending spars 163' The uppermost wings are also connected with the foremost stabilizer 154 by means of the tension cables 165.

Referring to Figure 16, of the drawings, it can be seen that the compression struts 133 hereinbefore mentioned each includes the vertically extending central bar 167, and the inclined side bars 168 which extend upwardly from the lower end of the central bar 167 to a horizontally disposed bar 169. Extending up from the horizontal bar 169, which is disposed adjacent to the upper end of the central bar 167, are inclined side bars 170 which are secured to the upper end of the central bar 167. Each compression strut is suitably braced by an internal frame 171 which consists of brace bars. These compression struts, as hereinbefore stated, extend up from the keel 132 to the main spar 131, which is preferably of a brace or truss construction.

The operation of this type of aeroplane is the same as the forms heretobefore described, and the same includes all of the features of the invention by which the aeroplane is permitted to arise nose first from the ground or sea, and land at an incline to the horizontal with its tail end first.

By referring to Figure 15 of the drawing, it can be seen that the rearmost vertical strut or compression member as indicated by the reference character 175, and its extension forms means for bracing the rear stabilizer 156.

In Figure 15, the improved control for the rudder 149 and the elevator 148 is shown, which is substantially the same as the form of the control illustrated in Figures 1 to 4 inclusive of the drawings, and it is to be understood that this form of control may also be adapted for the other forms of my invention.

In this form of control, suitable pulleys 176 are connected with the side walls of the stabilizer 156, and the control cables 177 are trained about the same. The pulleys 176 can of course be connected to the stabilizer 156 in any preferred manner above and below the tail plane 160, and thus upper and lower pull ropes will be provided for the elevator. The rudder 149 has connected thereto at a plurality of spaced points and on opposite sides thereof, short cables 178 which lead to pull ropes 179. The pull ropes 177 and 179 are trained about suitable guide pulleys 180 which are mounted upon one of the cross rods 169 of the strut members 133. These cables or coils 177 and 179 of course lead to one of the nacelles or coach bodies or to the control cab.

It can be seen, however, that the improved control is of simple construction and the operation of the rudder and elevator is considerably facilitated by the arrangement of the cable and guide pulleys.

Changes in details may be made without departing from the spirit or scope of this invention; but,

I claim:

1. In an airship, a longitudinally extending frame, a plurality of vertical compression struts connected with the frame arranged in longitudinal alignment, a plurality of longitudinally spaced aerofoils connected with the frame and spaced at their points of connection with the frame defining a longitudinally extending air space, and means disposed in said air space for dividing and directing the air stream under the aerofoils.

2. In an airship of the character described, a longitudinally extending frame, a plurality of longitudinally aligned spaced vertical compression struts connected with the frame, a plurality of spaced aerofoils carried by the frame and extending outwardly and upwardly from the opposite sides thereof, a plurality of spaced coaches disposed in alignment with said frame and compression struts and forming means for dividing the air stream and directing the same under the aerofoils.

3. In an airship of the character described, a longitudinally extending frame, a plurality of longitudinally aligned inclined struts connected with said frame, a plurality of outwardly and upwardly extending aerofoils carried by the frame, a plurality of spaced coaches connected with the frame and struts and disposed in direct alignment therewith and having a greater width than the struts and frame to form a wind deflecting surface therefor, the forward coach being provided with diverging sides forming an air stream deflecting surface for guiding the air stream under the aerofoils.

4. In an aeroplane, a frame, a plurality of aerofoils connected with the plane, a plurality of spaced vertically disposed stabilizers carried by the frame, each of the stabilizers including flat side walls, and forwardly extending converging front plates defining an air stream dividing leading edge.

5. In an aeroplane, a frame, a plurality of aerofoils connected with the frame, a plurality of spaced coaches carried by the frame, a plurality of upwardly extending stabilizers carried by the coaches and including flat side walls, and forwardly extending converging front walls defining an air stream dividing leading edge, certain of said stabilizers extending above the aerofoils.

6. In an aeroplane, a frame including a longitudinally extending frame, and a plurality of longitudinally aligned vertical compression struts, a plurality of longitudinally spaced aerofoils connected with the frame and extending outwardly and upwardly therefrom, the aerofoils being spaced at their points of connection with the frame defining a longitudinally extending air space, a plurality of spaced coaches disposed in said space, a plurality of upwardly extending stabilizers connected with the coaches and disposed in said space to cooperate with said coaches in giving the aeroplane a stabilizing balance, the coaches and stabilizers forming means for dividing the air stream and directing the same under the aerofoils, the frame and compression struts being in rear of and in direct alignment with said coaches and stabilizers.

7. In an airship, a frame, a plurality of laterally extending wings carried by the frame, a plurality of upwardly extending stabilizers and coaches associated with the frame, the coaches and stabilizers being provided with a vertically extending sharp leading edge for dividing the air current and flat side stabilizing walls for preventing side sway of the craft.

8. In an aircraft, a frame, a plurality of spaced aerofoils carried by the frame and disposed in space relation to each other at the longitudinal axis of the craft, a plurality of coach bodies, and a plurality of stabilizers carried by the coach bodies disposed at the longitudinal axis of the aircraft including front converging plates defining a front leading sharp wind dividing edge, and flat side plates, the leading stabilizer extending above said aerofoils.

9. In an aircraft, a frame, a plurality of spaced aerofoils carried by the frame, and a plurality of spaced coach bodies arranged in direct and longitudinal alignment associated with the frame, a plurality of upstanding vertically disposed stabilizers carried by the frame, the coach bodies and stabilizers being provided with a sharp leading air stream dividing edge, the leading edges of the coach bodies and stabilizers being in vertical alignment and flat vertically disposed side walls formed on the stabilizers and coaches, and an extension formed on the leading stabilizer including side plates inclining rearwardly from the sharp leading edge of a stabilizer to the rear trailing end thereof.

10. In an aircraft of the character described, a stabilizer including a relatively tall vertically disposed body including flat side walls extending parallel to the longitudinal axis of the aircraft and forwardly extending converging front side plates arranged to prevent lateral swaying of the aircraft, the forwardly extending converging front side plates defining a sharp leading edge for dividing the air currents, and a flat following rear wall.

11. In an aircraft of the character described, a stabilizer including an elongated vertically disposed body including a forwardly extending converging front plate and parallel relatively wide spaced side plates disposed in parallel relation to the longitudinal axis of the aircraft and arranged to prevent side sway of the aircraft, the forwardly extending converging front plates defining a sharp leading edge, and an extension formed on the upper end of the stabilizer including side plates inclining rearwardly and outwardly from the leading end of the stabilizer to the following end thereof.

12. In an aircraft of the character described, a nacelle coach body including longitudinally extending parallel side walls, a pair of converging front plates defining a front sharp leading edge, and a pair of bottom plates converging toward the longitudinal center of the body, said bottom plates inclining rearwardly and downwardly.

13. In an aircraft, a nacelle coach body including longitudinally extending side walls, a flat rear wall, converging front plates defining a vertically disposed sharp leading edge, and tractor and pusher propellers carried by the front and rear portions of the body.

14. In an aircraft, a nacelle coach body including longitudinally extending side plates, a flat rear plate, a pusher propeller disposed at the longitudinal axis of the body carried by the rear plate thereof, converging front plates defining a sharp front wind stream dividing edge, and inclined rearwardly and downwardly extending bottom walls, said side plates with the front plates and bottom walls defining means for insuring the dividing and guiding of the windstream whereby the pusher propeller blades will act in equal wind streams.

15. In an aircraft, a nacelle coach body including longitudinally extending side plates, a flat vertically disposed rear plate, a pair of converging front plates defining a front leading sharp edge, inclined bottom plates converging toward the longitudinal axis of the coach body defining a V-shaped bottom, said bottom plates inclining downwardly toward the rear end of the body, and a tractor propeller carried by the sharp leading edge of the body, and a pusher propeller carried by the flat rear wall.

16. In an aircraft, a rearwardly extending tail, guide pulleys carried by the tail, a vertically disposed stabilizer carried by the extreme end of the tail including parallel side plates disposed in parallel relation to the longitudinal axis of the craft and converging front plates defining a cutting leading edge, said converging front plates and parallel side plates defining means for insuring a stabilizing balance for the tail, tail plates extending laterally from the stabilizer, elevators carried by the trailing edges of the tail plates, a rudder disposed at the rear of the stabilizer, guide pulleys disposed at the rear on each side of the stabilizer, and pull ropes connected with the rudder and elevator and trained about said guide pulleys carried by the stabilizer and the guide pulleys carried by the tail, whereby an advantageous leverage is obtained by the controls.

17. In an aircraft, a rearwardly extending tail, guide pulleys carried by the tail, a stabilizer carried by the extreme end of the tail including flat side plates disposed in parallel relation to each other at the longitudinal axis of the aircraft forwardly extending converging front plates defining a leading cutting edge, a flat rear wall, tail planes, and guide pulleys carried at each side of the stabilizer, an elevator hingedly secured to the trailing edge of the tail plane, a rudder hingedly secured to the stabilizer, a control cab, carried by the tail, and control cables leading from said elevator and rudder to said control cab and trained about said pulley, whereby an advantageous leverage is obtained by the controls.

18. In an aircraft, a longitudinally extending frame, a plurality of equi-distantly spaced banks of aerofoils, each bank including spaced superposed aerofoils, means connecting the aerofoils together in each bank by vertical compression struts, means connecting the banks of aerofoils together by short longitudinally extending spars, the aerofoils being disposed in spaced relation at the longitudinal axis of the aircraft, and coach bodies and stabilizers disposed in the open spaces defined by the spaced aerofoils, the coach bodies and stabilizers having sharp leading edges for dividing and directing the wind stream under the aerofoils, the aerofoils being provided with upwardly inclined trailing edges disposed below the leading edges thereof for directing the wind stream under the following aerofoils.

19. In an aircraft, a longitudinally extending frame, a centrally disposed ship connected with the frame and extending from the front end thereof to the rear end thereof, side floats connected with the frame and extending from the front end thereof to a point short of the rear end thereof, the front and rear ends of the center ship and side floats being upturned, elevators carried by the rear end of the frame, a plurality of banks of spaced aerofoils, the forward aerofoils being disposed directly above the front end of the central ship and side floats and at the forward end of the frame, whereby the aircraft is permitted to rise nose first from the water, said aerofoils and elevators defining means for permitting the aircraft to land at an angle to the horizontal with its tail end lowermost so as to permit the easy landing thereof.

20. In an aircraft, a longitudinally extending frame, a center ship connected with the frame extending from the front end of the frame to the rear end of the frame, side floats connected with the frame and extending from the front end thereof to a point short of the rear end thereof, a plurality of spaced nacelle coach bodies disposed in collinear relation and starting at the extreme front of the center ship and side floats, and a plurality of banks of aerofoils carried by the frame and starting at the extreme front end thereof.

21. In an aircraft, a longitudinally extending frame, a center ship connected with the frame extending the entire length thereof, side floats connected with the frame and extending from the front end thereof to a point short of the rear end thereof, a plurality of spaced aerofoils carried by the frame, a plurality of nacelle coach bodies carried by the frame, the forward and rear ends of the float being upturned, the front upturned ends of the central ship and side floats being provided with sharp wind and water deflecting leading edges, the rear ends of the center ship and floats being provided with rearwardly extending relatively narrow longitudinally disposed fins, and a water rudder carried by one of said fins.

22. In an aircraft, a longitudinally extending frame, a central ship carried by the frame, side floats carried by the frame, upturned ends formed on the front of the central ship and side floats, the front of the central ship and side floats being provided with sharp wind deflecting leading edges, nacelle coach bodies carried by the upturned ends of the central ship and side floats, said bodies being provided with sharp airstream dividing leading edges, said sharp edges of said central ship, floats, and coach bodies being provided to lessen head on resistance and insure speed.

23. In an aircraft, a main longitudinally extending frame including spaced longitudinal spars and vertically disposed longitudinally aligned compression spars, side frames disposed in spaced relation to the central frame including longitudinally extending spars, and a spaced collinear related compression struts, means connecting the side and main frames together, a central ship and side floats carried by each of the frames, the central ship extending the entire length of the central frame, the side frames terminating short of the rear end of the central frame, a plurality of spaced banks of aerofoils, means connecting each aerofoil in each bank together, means connecting the banks of aerofoils together, and tension cables connecting the frames and aerofoils together.

24. In an aeroplane, a longitudinally extending main frame, a pair of side frames extending from the front end of the main frame and terminating short thereof, each of the frames including longitudinally extending spars and vertical longitudinally aligned compression struts, a plurality of spaced banks of aerofoils carried by the frames, compression struts connecting the aerofoils together in each bank, rearwardly extending spars connecting the banks of aerofoils together, a plurality of spaced nacelle coach bodies carried by the frames, a central ship and side floats carried by the frames, and disposed below the coach bodies, reinforcements formed on the central ship and side floats at spaced points, pusher and tractor propellers carried by the nacelle coach bodies and diagonally extending cross tension cables and steel rods extending through the coach bodies, and connected to the reinforcements of the central ship and side floats, and diagonally extending cross tension cables and steel rods connecting the frames together and connected to the reinforcements of the center ship and side floats, diagonally extending cross tension cables connecting the aerofoils together, and stabilizers carried by the frame, whereby defined means of said frames and compression struts including tension cables and steel rods define means for bracing and holding firm the entire structure throughout the length thereof.

25. A central ship or side float for seaplanes, comprising a relatively narrow longitudinally extending body, upturned ends formed on the terminals of the body, the front upturned end including converging front plates forming a windstream and water dividing leading edge, and a rearwardly extending vertically disposed fin carried by the rear end of the body and extending below the upturned end thereof.

26. In an aircraft, a longitudinally extending frame, a plurality of compression struts disposed in spaced relation throughout the length of the frame, a plurality of aerofoils connected with the struts and frame, a plurality of spaced nacelle coach bodies, tractor and pusher propellers carried by the coaches, and landing wheels carried by the lower surfaces of the coach bodies.

WAYNE E. IKERMAN.